United States Patent
Lutaud

(10) Patent No.: US 6,561,518 B1
(45) Date of Patent: May 13, 2003

(54) SEAL ARRANGEMENT WITH A SEALING FLANGE AND A CARRIER FLANGE

(75) Inventor: Dominique Lutaud, Orbigny au Mont (FR)

(73) Assignee: Firma Carl Freudenberg, Weinheim (DE)

(*) Notice: Subject to any disclaimer, the term of this patent is extended or adjusted under 35 U.S.C. 154(b) by 0 days.

(21) Appl. No.: 09/696,456

(22) Filed: Oct. 25, 2000

(30) Foreign Application Priority Data

Oct. 25, 1999 (DE) .......................................... 199 51 340

(51) Int. Cl.⁷ ................................................ F16J 15/32
(52) U.S. Cl. ...................................................... 277/549
(58) Field of Search ....................... 250/231.13, 231.18, 250/231.14; 277/321, 353, 549, 551, 572, 573, 574

(56) References Cited

U.S. PATENT DOCUMENTS

| | | | | |
|---|---|---|---|---|
| 4,331,029 A | * | 5/1982 | Wilson ...................... 73/117.3 |
| 4,338,517 A | * | 7/1982 | Perrine ................... 250/231.13 |
| 4,365,152 A | * | 12/1982 | Gergek ................... 250/231.13 |
| 5,111,796 A | * | 5/1992 | Ogita ......................... 123/458 |
| 5,152,538 A | * | 10/1992 | Mims ......................... 277/575 |
| 5,250,921 A | * | 10/1993 | Van Laningham et al. ... 192/84.941 |
| 5,363,744 A | * | 11/1994 | Pichler ....................... 277/436 |
| 5,773,820 A | * | 6/1998 | Osajda et al. .......... 250/231.14 |
| 6,250,637 B1 | * | 6/2001 | Oricchio, Jr. ............... 277/321 |

FOREIGN PATENT DOCUMENTS

| | | |
|---|---|---|
| DE | 0 565 771 A1 | * 10/1993 |
| DE | 43 12 424 | 10/1994 |

* cited by examiner

Primary Examiner—Anthony Knight
Assistant Examiner—Doug Hutton
(74) Attorney, Agent, or Firm—Kenyon & Kenyon

(57) ABSTRACT

A seal arrangement having a sealing flange (1) with at least one first seal (2) and a carrier flange (3) with a holder (4) for a sensor (5). The sealing flange (1) and the carrier flange (3) are each produced separately, are made of a metallic material, and are connected with one another with a non-positive and/or a positive lock.

16 Claims, 2 Drawing Sheets

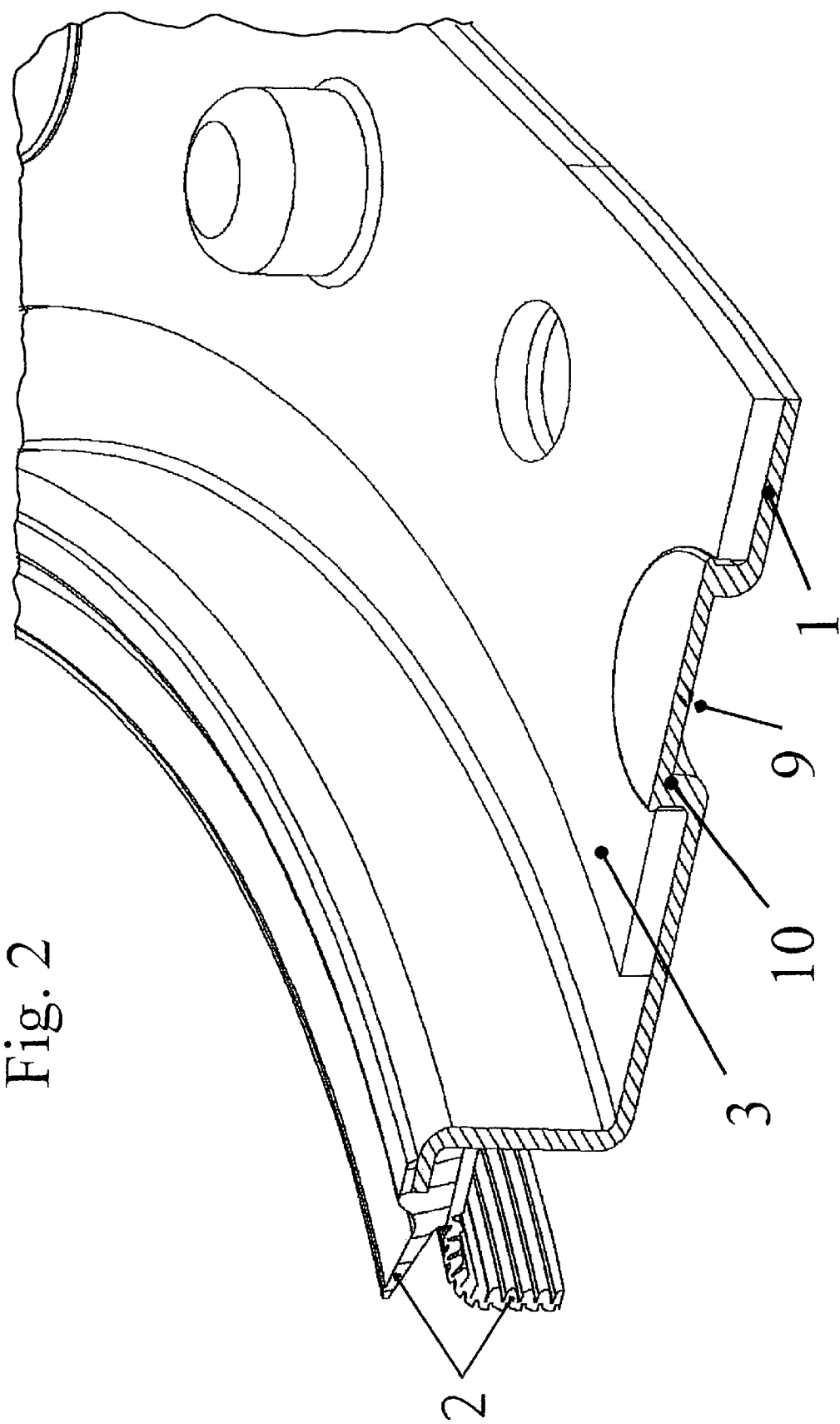

SEAL ARRANGEMENT WITH A SEALING FLANGE AND A CARRIER FLANGE

FIELD OF THE INVENTION

The present invention relates to a seal arrangement. In particular, the present invention relates to a seal arrangement including a sealing flange with at least one first seal and a carrier flange with a holder for a sensor.

BACKGROUND OF THE INVENTION

A similar seal arrangement is known from German Patent 43 12 424 C2. The seal arrangement disclosed in that patent includes a housing closure lid with a device to set the speed of rotation, and a dynamic sealing ring. The sealing flange and the carrier flange are formed in one piece and are made of a light metal. The holder for the sensor must be cut into the carrier flange after the flange is formed. A significant effort in production is required to eliminate the possibility that the placement of the sensor is subject to undesirably great tolerances due to production conditions. This is not very satisfactory from an economic point of view. The tolerances of the sensor placement result from the sum of the tolerances of the clamping mechanisms for the flange while it is being cut, and the tolerances in guidance of the machining tool. The consequences can be, for example, incorrect measurement values concerning the angle of rotation of a shaft of an internal combustion engine. These values are provided to the engine management system.

After the holder for the previously known seal arrangement has been cut into the carrier flange, it is necessary to clean it to remove chips. This further increases the production effort.

If the flange is made of a light metal, for example, complicated injection molding dies are required. These injections molding dies are very expensive. They therefore can only be economically justified if very high numbers of pieces are made.

SUMMARY OF THE INVENTION

An object of the present invention is to develop a seal arrangement that can be produced in a simple and inexpensive manner, in terms of production technology and economics. Another object of the invention is to develop a seal arrangement that can be recycled in a problem-free way. Yet another object is to develop a seal arrangement such that positioning of the sensor holder is subject only to tolerances that are small enough to be ignored.

To achieve these objects, a seal arrangement is provided with a sealing flange and a carrier flange. The sealing flange and the carrier flange are each produced separately. Both flanges are made of a metallic material, and are connected with each other with a non-positive and/or a positive lock. Because the sealing flange and the carrier flange are each produced separately, they can be produced with particular accuracy and inexpensively (i.e. with a relatively small amount of production effort). Preferably, the same metallic material is used for the sealing flange and the carrier flange. Both parts will then demonstrate heat expansion. This assures secure contact of the parts against one another and uniformly good usage properties over the entire period of use. With a view to separation of materials for recycling, the fact that the materials of the sealing flange and the carrier flange are the same is an advantage that must be emphasized. Joining methods using a non-positive and/or positive lock are simple to carry out and are characterized by good durability. The durability is particularly good if the parts that are connected with one another are made of the same material and therefore demonstrate the same behavior in operation.

In accordance with an advantageous further development, the first seal can be structured as a radial shaft seal and surrounds a shaft that is to be sealed, under pre-stress, forming a seal. In this connection, it is preferred if the radial shaft sealing ring is vulcanized directly onto the sealing flange. The geometry of the sealing lips of the first seal is dependent on the application, in each instance, and different materials can also be used for the sealing lips.

The sensor can be structured as a speed of rotation sensor, to determine the speed of rotation of the shaft to be sealed. If necessary, the sensor can also detect the angle of rotation and/or quiet running of the shaft to be sealed. Such sensors for determination of operational data are used, for example, in order to determine the operational data of the crank shaft of an internal combustion engine. In such a case, the operational data are used to meter the fuel in an optimum manner, via the engine management system, to minimize harmful combustion products, and to detect possible engine misfires.

In addition to the first seal, the sealing flange can have a second seal that acts in the axial direction and/or a third seal that acts in the radial direction. The first seal can surround the crank shaft of an internal combustion engine, where the second seal rests against the engine block and the third seal rests against the oil pan of the internal combustion engine, forming a seal. By means of such a so-called complete flange with an integrated sensor, installation and handling of the seal arrangement is significantly simplified. The sealing flange and the carrier flange form a pre-assembled unit, where the pre-assembled unit includes all the seals arranged on the sealing flange and the sensor arranged on the holder of the carrier flange.

With an view to inexpensive production, the sealing flange and the carrier flange can each be made of a metallic material and be structured in sheet-metal form. The sealing flange and the carrier flange can each be shaped without cutting, and thereby brought into their ready-to-use shape. The holder is an integral part of the carrier flange, and is produced by shaping without cutting. Metallic materials are particularly advantageous for the application described above because they retain their shape even at high temperatures and do not demonstrate any relaxation phenomena, even during a long period of use.

Because the holder is an integral part of carrier flange, the assignment of holder and carrier flange to one another is determined in production. The risk of assembly errors and disadvantageous usage properties that might result from them is therefore limited to a minimum.

The sealing flange or the carrier flange can have recesses, where the carrier flange or the sealing flange have projections and where the recesses and the projections are structured to be congruent and are connected with one another. Preferably, the sealing flange and the carrier flange can be held together by the recesses and the projections. To hold the two parts in place relative to one another, the projections are inserted into the recesses, and subsequently shaped without cutting, in such a way that the projections have a larger size and/or a different shape from the recesses. Separation of the sealing flange and the carrier flange is then no longer possible without deforming the linked projections and/or destroying the join. The sealing flange and the carrier flange also may be glued together.

Because of the method of production, which does not involve any cutting, contamination of the seal arrangement by metal chips, for example, which could result in damage/ destruction of the seal, is precluded. There cannot be any adhering light metal chips, as is frequently an objection for flanges made of light metal that are produced with cutting steps involved.

BRIEF DESCRIPTION OF THE DRAWINGS

FIGS. 1 and 2 show a partial perspective view of an exemplary embodiment of the seal arrangement according to the present invention.

DETAILED DESCRIPTION OF THE INVENTION

Figure 1:
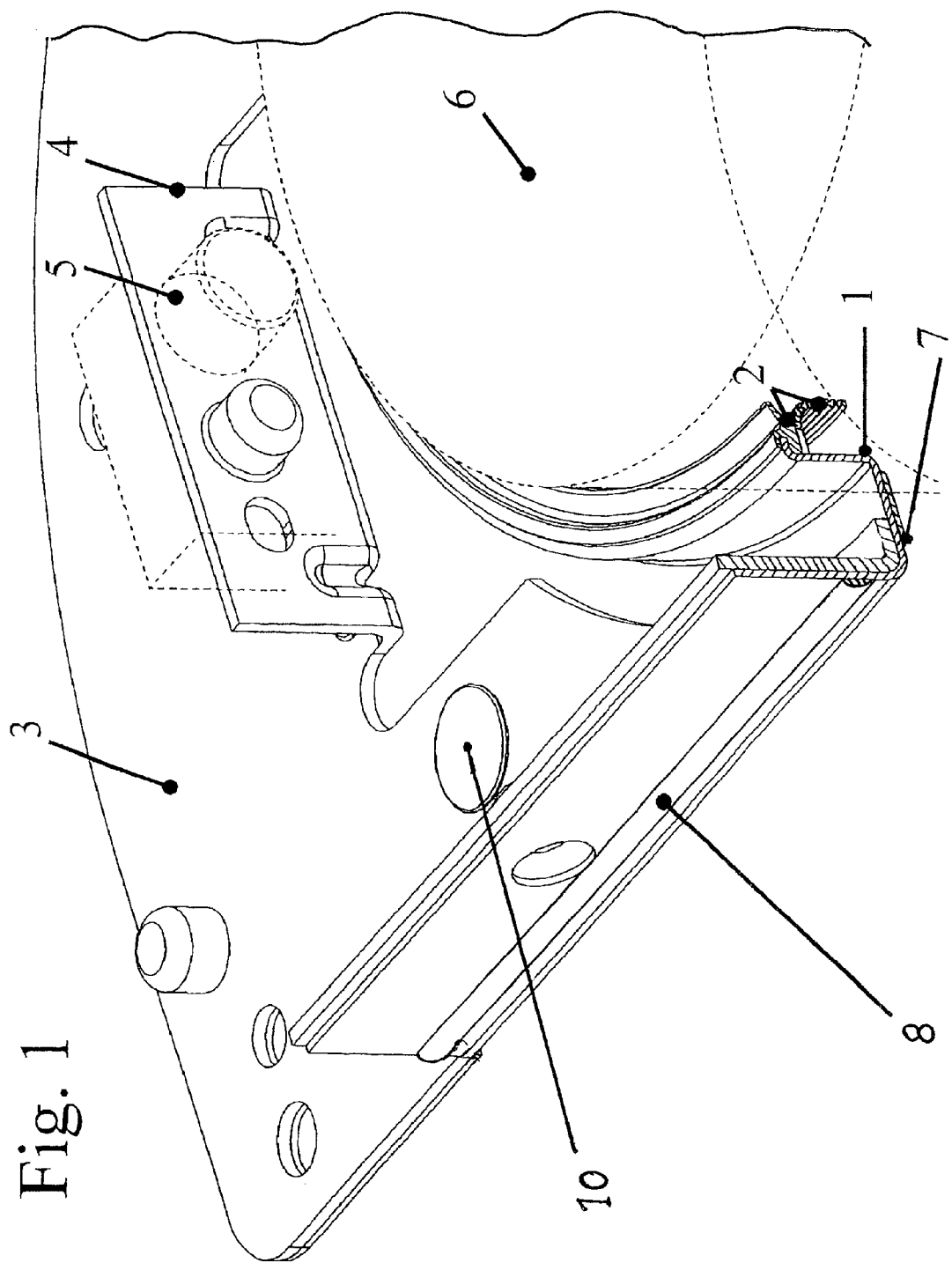

FIG. 1 shows the sealing flange 1, fixed in place on the carrier flange 3, which has a holder 4 molded onto it in one piece.

FIG. 2 shows a cutout of FIG. 1, where the cross-section in this figure passes through a join between the sealing flange and the carrier flange.

FIG. 1 shows a cutout of an exemplary embodiment of a seal arrangement. The seal arrangement includes a sealing flange 1 and a carrier flange 3. Both the sealing flange 1 and the carrier flange 3 are made of sheet metal. The flanges are fixed in place with respect to one another by a positive lock.

In the illustrated embodiment, sealing flange 1 has three seals 2, 7, 8. The first seal 2 is structured as a radial shaft seal and surrounds a shaft 6 that is to be sealed. The shaft 6 can be, for example, the crank shaft of an internal combustion engine. The first seal 2 is under pre-stress, forming a seal. A second seal 7 acts in the axial direction and rests against a second surface to be sealed. The second surface can be an engine block, not shown here. A third seal 8, which acts in the radial direction, rests against a third surface to be sealed, such as an oil pan, again not shown, of an internal combustion engine.

The carrier flange 3 is provided with a holder 4 that is integrally molded on the carrier flange 3. The holder 4 has an opening to hold a sensor 5.

In this exemplary embodiment, the sealing flange 1 has projections 10 that are arranged in recesses 9 of the carrier flange 3. The sealing flange 1 is shaped to remain in place on the side of recesses 9 that face away from the carrier flange. Because of the positive lock, secure positioning and centering of the sealing flange and carrier flange 3 over a long period of use are guaranteed.

FIG. 2 shows a cutout of the exemplary embodiment of FIG. 1. The cross-section runs through the join between sealing flange 1 and carrier flange 3. Projections 10 of sealing flange 1 penetrate recesses 9 of carrier flange 3. Because of the plastic deformation of projections 10, the latter clamp into the undercut recesses and thereby form a permanent connection.

What is claimed is:

1. A seal arrangement comprising a sealing flange with at least one seal and a carrier flange with a holder for a sensor, the holder being an integral part of the carrier flange, wherein a first seal of the sealing flange surrounds a crankshaft of an internal combustion engine;

wherein the sealing flange, the first seal and the carrier flange are each produced separately, are made of a metallic material, and are permanently interconnected to one another, the sealing flange and the carrier flange being in direct contact with one another, the sealing flange or the carrier flange having recesses, the carrier flange or the sealing flange having projections, and the recesses and the projections are structured to be congruent and are connected to one another, wherein the sealing flange and the carrier flange are held together by the recesses and the projections or are glued together.

2. The seal arrangement according to claim 1, including a sensor, wherein the sensor is a speed of rotation sensor or angle of rotation sensor to determine the speed of rotation or the angle of rotation of the shaft to be sealed.

3. The seal arrangement according to claim 1, wherein the sealing flange and the carrier flange are each made of a metallic material and structured in sheet-metal form.

4. The seal arrangement according to claim 1, wherein the sealing flange and the carrier flange are glued togther.

5. The seal arrangement according to claim 1, wherein the sealing flange and the carrier flange are made of the same metallic material.

6. The seal arrangement according to claim 1, wherein the projections are located in the recesses, and upon subsequent shaping without cutting, the projections have a larger size or different shape than the recesses.

7. The seal arrangement according to claim 1, including a sensor, wherein the sensor is a speed of rotation sensor and angle of rotation sensor to determine the speed of rotation and the angle of rotation of the shaft to be sealed.

8. The seal arrangement according to claim 1, wherein the sealing flange has a second seal that acts in an axial direction.

9. The seal arrangement of according to claim 8, wherein the first seal surrounds the crankshaft of the internal combustion engine with an engine block, and the second seal rests against the engine block.

10. The seal arrangement according to claim 9, wherein the sealing flange has a third seal that acts in a radial direction.

11. The seal arrangement according to claim 10, wherein the third seal rests against an oil pan of the internal combustion engine.

12. The seal arrangement according to claim 1, wherein the first seal is structured as a radial shaft seal and surrounds the crankshaft that is to be sealed under pre-stress, forming a seal.

13. The seal arrangement according to claim 12, including a sensor, wherein the sensor is a speed of rotation sensor or angle of rotation sensor to determine the speed of rotation or the angle of rotation of the shaft to be sealed.

14. The seal arrangement according to claim 12, including a sensor, wherein the sensor is a speed of rotation sensor and angle of rotation sensor to determine the speed of rotation and the angle of rotation of the shaft to be sealed.

15. A seal arrangement comprising a sealing flange with at least one seal and a carrier flange with a holder for a sensor, the sensor being arranged on the holder, which is an integral part of the carrier flange, wherein a first seal of the sealing flange surrounds a crankshaft of an internal combustion engine, a second seal of the sealing flange acts in an axial direction and a third seal of the sealing flange acts in the radial direction;

wherein the sealing flange, the carrier flange and the first seal are each produced separately, are made of a metallic material, and are permanently interconnected to one another, the sealing flange and the carrier flange being in direct contact with one another, the sealing flange or the carrier flange having recesses, the carrier flange or the sealing flange having projections, and the recesses and the projections are structured to be congruent and are connected to one another, wherein the sealing flange and the carrier flange are held together by the recesses and the projections or are glued together.

16. The seal arrangement of claim 15 wherein the sealing flange and the carrier flange form a pre-assembled unit, the pre-assembled unit including the first seal, the second seal and the third seal arranged on the sealing flange and the sensor arranged on the holder of the carrier flange.

* * * * *